United States Patent
Kaiser et al.

(10) Patent No.: US 6,641,650 B1
(45) Date of Patent: Nov. 4, 2003

(54) GELLED PRINTING INK COMPOSITIONS

(76) Inventors: Conard E. Kaiser, 5817 Centralcrest, Houston, TX (US) 77092; Jock R. Collins, 5817 Centralcrest, Houston, TX (US) 77092; James R. Collins, 5817 Centralcrest, Houston, TX (US) 77092

( * ) Notice: Subject to any disclaimer, the term of this patent is extended or adjusted under 35 U.S.C. 154(b) by 117 days.

(21) Appl. No.: 09/793,867

(22) Filed: Feb. 26, 2001

Related U.S. Application Data

(60) Provisional application No. 60/184,568, filed on Feb. 24, 2000.

(51) Int. Cl.[7] .......................... C09D 11/02; C09D 11/10; C09D 11/06
(52) U.S. Cl. ................................ 106/31.13; 106/31.27; 106/31.28; 106/31.35; 106/31.6; 106/31.75; 106/31.86; 106/31.9; 252/315.01; 252/315.1; 252/315.4; 524/239; 524/247; 524/249; 524/556
(58) Field of Search ........................ 252/315.01, 315.4, 252/315.1; 524/556, 239, 247, 249; 106/31.13, 31.27, 31.28, 31.35, 31.6, 31.75, 31.86, 31.9

(56) References Cited

U.S. PATENT DOCUMENTS

| | | | | |
|---|---|---|---|---|
| 5,147,457 A | * | 9/1992 | Hino et al. ................. | 106/241 |
| 5,420,118 A | * | 5/1995 | Alban et al. .................. | 514/63 |
| 5,585,092 A | * | 12/1996 | Trandai et al. .............. | 424/401 |
| 5,721,275 A | * | 2/1998 | Bazzano .................. | 424/78.02 |

FOREIGN PATENT DOCUMENTS

| | | | | |
|---|---|---|---|---|
| WO | WO 9732559 A1 | * | 9/1997 | ............ A61K/7/00 |

* cited by examiner

*Primary Examiner*—Kelechi Egwim
(74) *Attorney, Agent, or Firm*—Kenneth A. Roddy

(57) ABSTRACT

A smooth stable viscous gelled printing ink composition comprising a mixture of water, a gelling agent, a chelating agent, and a colorant or pigment, property enhancing additives evenly dispersed into the mixture, and an alkaline electrolyte viscosity increasing agent that raises the pH of the mixture and forms a smooth homogeneous stable gel with a viscosity level having the consistency of a custard or jelly. In addition to the colorants or pigments, additives may also include drying oils, resins, surfactants, film forming components, water flight agents, and other additives. The stabilized gel prevents separation and settling of the homogeneously suspended colorants, pigments, and property enhancing additives, and significantly improves storage stability. The ink compositions do not require shaking, stirring, or mixing prior to use are fast drying on paper, and do not dry on the printing press, in the storage containers, or in the ink jet or bubble jet injector nozzles. The gelled ink compositions with property enhancing additives also have improved non rub-off characteristics, excellent printability, high color strength, good water balance, less mist, and sharp halftone reproduction.

3 Claims, No Drawings

GELLED PRINTING INK COMPOSITIONS

CROSS REFERENCE TO RELATED APPLICATIONS

This application claims priority of U.S. Provisional Application Ser. No. 60/184,568 filed Feb. 24, 2000, the pendency of which is extended until Feb. 26, 2001 under 35 U.S.C. 119(e)(3). This application is closely related to U.S. patent application Ser. No. 09/307,502, now U.S. Pat. No. 6,201,050, which is hereby incorporated by reference to the same extent as if fully set forth herein.

BACKGROUND OF THE INVENTION

1. Technical Field of the Invention

This invention relates generally to water-based printing inks of the type used for newspaper and lithographic printing and in cartridges for ink jet and other computer printers, and more particularly to stable viscous gelled printing ink compositions that contain colorant pigments and other additives in a gel base which prevents separation of the pigments and other additives and imparts improved storage stability while maintaining the desired characteristics of good print quality, water and smear resistance, and light fastness.

2. Brief Description of the Prior Art

Conventional inks are generally composed of a colorant such as carbon black or other colorants as well as additives that increase anti-smudging and ease of use characteristics. Whether the printing is done by offset, letterpress, ink jet or other printing method, all are plagued by the problem of separation of the ink components during storage prior to use.

Carbon black has excellent properties of color and light fastness, however in order to use carbon black in aqueous ink compositions, the carbon black must be dispersed in the medium and then stabilized to prevent separation. Some other pigments also tend to settle and separate during storage Thus, there is a long-felt need for printing inks to not separate during storage and that are easy to handle and use without having to be shaken, stirred or otherwise mixed prior to use in order to re-suspend the carbon black and other colorants and additives. There is also a continuing need for printing inks that are fast-drying, have improved printability, high color strength, good water balance, and sharp halftone reproduction. These and other desired characteristics can be produced in gelled printing inks that do not separate during storage.

Previous attempts by others to produce storage stable inks include incorporating many ingredients including clays, organo-metalic gelling agents, resins and other polymeric components into the compositions.

Ma, et al, U.S. Pat. No. 5,085,698 discloses a pigmented ink for ink jet printers comprising an aqueous carrier medium, and pigment particles dispersed in an acrylic/acrylate block copolymer serving as a stabilizing agent. The copolymer has a hydrophilic segment and a segment that links to the pigment.

Williams, et al, U.S. Pat. No. 5,844,071 discloses a process for making high viscosity gelled ink resins using a resin conducted through an extruder with a cross-linking agent, preferably a heat reactive phenolic resin, to produce a high viscosity resin that resists viscosity breakdown under high shear conditions. The resulting gelled ink resins may be used directly in making ink obviating the need for further gelation and avoiding the use of conventional organio-metallic gelling agents.

Beach, et al, U.S. Pat. No. 5,869,564 discloses an aqueous ink composition with improved storage stability for use in ink jet printers comprising an aqueous carrier; a pigment; and a copolymer comprising a hydrophilic segment having an acidic function group, and a hydrophobic segment having a hydrolytically stable siloxyl substituent.

The present invention overcomes the problems discussed above and is distinguished over the prior art in general and these patents in particular, by a stable viscous gelled printing ink composition wherein colorants, pigments, and other property enhancing additives are dispersed in a water-based gel carrier to provide a smooth viscous homogeneous stable printing ink gel having the consistency of a custard or jelly. The stabilized gel prevents separation and settling of the homogeneously suspended colorants, pigments, and property enhancing additives, and significantly improves storage stability. The ink compositions do riot require shaking, stirring, or mixing prior to use, are fast drying on paper, and do not dry on the printing press, in the storage containers, or in the ink jet or bubble jet injector nozzles. The gelled ink compositions with property enhancing additives also have improved non rub-off characteristics, excellent printability, high color strength, good water balance, less mist, and sharp halftone reproduction.

SUMMARY OF THE INVENTION

It is therefore an object of the present invention to provide a stable viscous gelled printing ink composition wherein there is no-separation or settling of the colorants, pigments, and property enhancing additives, and thus has excellent storage stability and long shelf life.

It is another object of this invention to provide a printing ink composition wherein colorants, pigments, and other property enhancing additives are homogeneously suspended in a smooth stable viscous gel having the consistency of a custard or jelly.

Another object of this invention is to provide a smooth stable viscous gelled printing ink composition which does not require shaking , stirring, or mixing prior to use.

Another object of this invention is to provide a smooth stable viscous gelled printing ink composition which is fast drying on paper, but does not dry on the printing press, in the storage containers, or in the ink jet or bubble jet injector nozzles.

A further object of this invention is to provide a smooth stable viscous gelled printing ink composition having homogeneously suspended colorants, pigments, and property enhancing additives, that has improved non rub-off characteristics, excellent printability, high color strength, good water balance, less mist, and sharp halftone reproduction.

Other objects of the invention will become apparent from time to time throughout the specification and claims as hereinafter related.

The above noted objects and other objects of the invention are accomplished by a smooth stable viscous gelled printing ink composition comprising a mixture of water, a gelling agent, a chelating agent, and a colorant or pigment, property enhancing additives evenly dispersed into the mixture, and an alkaline electrolyte viscosity increasing agent that raises the pH of the mixture and forms a smooth homogeneous stable gel with a viscosity level having the consistency of a custard or jelly.

DETAILED DESCRIPTION OF A PREFERRED EMBODIMENT

In the following discussion each ingredient is added to water in the order listed and is completely dispersed and thoroughly mixed before adding the next ingredient. After thorough mixing, the mixture forms a stable homogeneous viscous gelled printing ink composition which has the consistency of a custard or jelly.

In producing the present ink compositions, a gelling agent such as a cross-linked polyacrylic acid is added to water in the ratio of from about 0.001% to about 10% by weight, and thoroughly mixed with a suitable mixer such as a Day type ribbon blender at about 50 to 70 rpm for about 5 minutes. The gelling agent significantly lowers the pH of the water. The resultant free-flowing liquid state facilitates the addition of the desired colorants and additives. Then, from about 0.001% to about 5% by weight of a chelating agent, such as ethylene diamine tetraacetic acid (EDTA) is then added with continuous mixing, to be followed by the addition of the desired colorants and other desired additives, discussed below. The chelating agent binds excess ions in the mixture. If the water is very hard, that it contains significant amounts of calcium or if the other additives to be added later contain high levels of cations, more of the chelating agent may be used to provide proper gelling. After the colorants and other desired additives (discussed below) have been added and uniformly mixed and evenly dispersed with continuous mixing, from about 0.002% to about 3% by weight of a neutralizing agent or alkaline electrolyte such as triethanolamine is added and thoroughly mixed in for about 20 minutes to obtain the desired viscosity and tack. The neutralizing agent or alkaline electrolyte adjusts the pH of the composition to produce a smooth stable homogeneous gelled ink having a viscosity and consistency of a custard or jelly.

In addition to the colorants, the additives may also include drying oils, resins, surfactants, film forming components, water flight agents, and other additives. Any suitable colorant can be used to prepare inks in accordance with the present invention. The colorant may be a dye or a pigment, organic or inorganic, as long as they are compatible with the gelling process. Some examples of suitable colorants include, but are not limited to, metallized azos such as barium or calcium salts, toluidines, naphthols, pyrazalones, rhodamines, quinacridones, phthalocyalnines, phthalocyanines, carbazoles perylene pigments, pigments including the magnesium salts, lead chromes and silicochromates, zinc chromes, barium chromate, strontium chromate, titanium nickel yellow, liminites, haematites, magnetites, micaceous oxides of iroin, siderite, iron pyrites, ferrites, and Prussian Blue to name a few colors (as opposed to shades—blacks or grays).

Suitable carbon black colorants include channel black, furnace black, and lamp black. Carbon black is a preferred colorant for black inks. Such colorants can have it wide range of particle sizes, all of which are easily suspended by the gel technology. In order to obtain good dispersion of the colorant in the ink vehicle before gelling and therefore good color strength, the colorant may be suitably treated so as to break down any aggregates and agglomerates. The colorant can be broken down to a suitable particle size by any appropriate means known to those skilled in the art and then gelled. The colorant may be present in inks in amounts of from about 0.5% to about 50% by weight.

Any suitable amount of a drying oil additive can be used in the composition, which is effectively suspended when the gel is formed while the continuous sheer forced are being applied during manufacture of the gelled inks.

Hydrocarbon resins in any suitable amount can be used in the composition. The hydrocarbon resins may be natural or synthetic. Excessive use of the hydrocarbon resin will adversely affect the color strength of the image and the print quality. Binder resins in any suitable amount can be used in the composition. The binder resin provides a coating on the colorant particles. The binder resin should be soluble in the oil, and interact with the other components of the ink to produce a durable, tough film on the colorant. Binder resins are easily incorporated into the inks using the gel technique. Adhesion promoters that improve the adhesion of the ingredients of the ink concentrate to the colorant particle may also be used, particularly when an oil modified polyamide is used as the binder resin. The adhesion promoter assists in the formation of a good coating on the colorant particle.

The ink composition of the present invention may preferably use a suitable surface-active agent or surfactant to facilitate and stabilize the ink. The surface-active agent may also reduce the surface tension energy of the oils, thereby increasing the drying rate of the ink. Any suitable surface-active agent can be used, including anionic, cationic, nonionic, amphoteric surface active agents, and combinations thereof. Nonionic surface active agents are preferred for they require the least compensatory corrections in the gelling formulation. Any suitable amount of the surface-active agent may be used.

The ink composition of the present invention may also utilize a film forming component which forms a film rapidly and secures the colorant particles to the paper. Any suitable film forming component can be used for they are efficiently stable incorporated into the gelled ink composition.

The ink composition of the present invention may also utilize a water flight agent to prevent the ink from picking up water during use. The water flight agent is a hydrophobic material. Any suitable water flight agent can be used.

It should be understood that the present gelled ink composition does not use rheological additives. Clays such as kaolites, illinites, hallosites montmorrillonites, attapulgites, allophanes and other viscosity and yield value agents are not necessary and therefore are not used in the gelled inks thereby eliminating the rub-off and smearing, color masking, and other characteristics imparted by the use of such materials.

Viscosity and tack are easily adjusted by altering the relative quantities of the gelling components. Colorant particle size becomes relatively unimportant in storage stability in that the gelling process relatively easily compensates for, and efficiently suspends, almost any particle size fine enough to be used in printing inks.

While this invention has been described fully and completely with special emphasis upon preferred embodiments, it should be understood that within the scope of the appended claims the invention may be practiced otherwise thin as specifically described herein.

What is claimed is:

1. A stable viscous gelled printing ink composition for use in printing presses, ink jet printers, and bubble jet printers, comprising a mixture of:

water;

from about 0.01% to about 10% by weight of a cross-linked polyacrylic acid gelling agent to significantly lower the pH of the mixture;

from about 0.001% to about 5% by weight of ethylene diaminetetraacetic acid as a chelating agent to bind excess ions in the mixture;

from about 5.0% to about 50% by weight of a colorant selected from the group consisting of organic dyes and pigments, and inorganic dyes and pigments to produce a uniform color;

at least one property enhancing additive evenly dispersed into the mixture in an amount sufficient to enhance the properties of the ink composition; and from about 0.002% to about 3% by weight of an alkaline electrolyte viscosity increasing agent selected from the group consisting of triethanolamine, a mixture of sodium hydroxide and water, and a dilute mixture of an amine component to raise the pH of the mixture and form the mixture into a smooth homogeneous stable gel printing ink with a viscosity level having the consistency of a custard or jelly; wherein said gelled printing ink composition does not require shaking stirring or mixing prior to use, is fast drying on paper, and does not dry in a printing press, in storage containers, or in ink jet or bubble jet injector nozzles.

2. The viscous gelled printing ink composition according to claim 1, further comprising a surfactant in an effective amount sufficient to reduce the surface tension of the mixture.

3. The viscous gelled printing ink composition according to claim 1, wherein said at least one property enhancing additive is selected from the group consisting of binders, drying oils, resins, film forming agents, water flight agents, and adhesion promoters.

* * * * *